Figure 1:
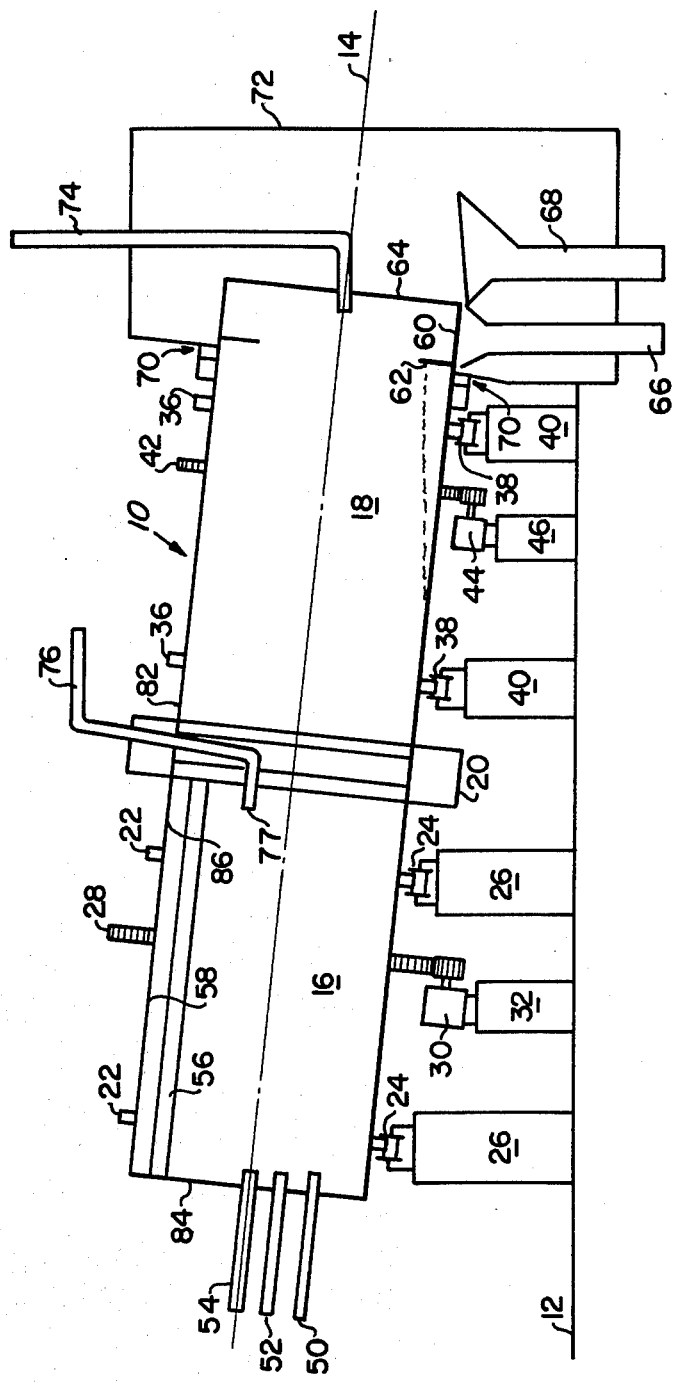

United States Patent [19]

Wasson

[11] 4,221,570
[45] Sep. 9, 1980

[54] METHOD AND APPARATUS FOR PRODUCING HARDENED CARBONACEOUS AGGLOMERATES

[75] Inventor: George E. Wasson, Eighty-Four, Pa.

[73] Assignee: Continental Oil Company, Stamford, Conn.

[21] Appl. No.: 30,667

[22] Filed: Apr. 16, 1979

[51] Int. Cl.² .......................... C10L 5/00; C10B 1/10; C10B 57/12
[52] U.S. Cl. ..................... 44/10 K; 44/12; 34/210; 201/36; 202/216
[58] Field of Search .......................... 44/24, 2, 11–13, 44/1 F, 10 K; 201/5, 6, 36; 202/211, 216; 34/210

[56] References Cited

U.S. PATENT DOCUMENTS

| | | | |
|---|---|---|---|
| 2,966,400 | 12/1960 | Lykken | 44/2 X |
| 3,401,089 | 9/1968 | Friedrich et al. | 201/6 |
| 3,671,401 | 6/1972 | Gorin | 201/6 X |
| 4,050,990 | 9/1977 | Lorenz | 201/5 |

Primary Examiner—Carl F. Dees
Attorney, Agent, or Firm—F. Lindsey Scott; William A. Mikesell, Jr.

[57] ABSTRACT

An improved method and apparatus for producing hardened carbonaceous agglomerates from a feedstock selected from the group consisting of finely divided coal solids, finely divided coal-derived solids and hydrocarbonaceous binders is disclosed.

7 Claims, 2 Drawing Figures

METHOD AND APPARATUS FOR PRODUCING HARDENED CARBONACEOUS AGGLOMERATES

This invention relates to the production of hardened carbonaceous agglomerates.

This invention further relates to the production of such hardened carbonaceous agglomerates from feedstocks such as finely divided coal solids, finely divided coal-derived solids, hydrocarbonaceous binders and the like by tumbling such feedstocks at an elevated temperature in a rotary kiln In numerous industrial applications it is desirable to produce hardened carbonaceous agglomerates from finely divided coaly solids, coal-derived solids, hydrocarbonaceous binders and the like. Such applications comprise the production of metallurgical grade coke; the production of fixed-bed gasifier feedstocks and the like. The applications generally comprise those instances where it is desirable to have discrete particles of a substantial size as a feedstock to industrial processes wherein the feedstock is available as finely divided solids or wherein it is desired to modify the properties of the solids as the agglomerates are produced. Some processes wherein such technology is utilized are set forth in the following United States patents:

| | | |
|---|---|---|
| 3,073,751 | January 15, 1963 | E. Gorin et al |
| 3,368,012 | February 6, 1968 | A. R. Erickson |
| 3,401,089 | September 10, 1968 | R. J. Friedrich et al |
| 3,460,195 | August 12, 1969 | A. R. Erickson |
| 3,562,783 | February 9, 1971 | E. Gorin |
| 3,671,401 | June 20, 1972 | E. Gorin |
| 3,748,254 | July 24, 1973 | E. Gorin |
| 3,988,114 | October 26, 1976 | E. Gorin et al |
| 4,008,054 | February 15, 1977 | J. T. Clancey et al |
| 4,030,982 | June 21, 1977 | E. Gorin et al |
| 4,046,496 | September 6, 1977 | E. Gorin et al |

These patents were considered in the preparation of the subject application and are hereby are incorporated in their entirety by reference. A continuing problem in such processes arises from the fact that such rotary kilns are typically adiabatic, with the heat used to facilitate agglomeration and the like being provided by the feed streams, in other words the feed streams are heated and charged to the kiln which operates without external heating or the like. Such is desirable since oxidation in many instances is undesirable, especially in the forming section of such kilns. Typically the feedstocks are tumbled in a first section of the kiln to form the agglomerates, and in this section it is desirable that the materials be plastic or softened so that the agglomerates can readily form. As the agglomerates move outwardly through the kiln, they are hardened by residence time in the kiln at elevated temperature to carbonize or otherwise harden the agglomerates to produce the desired agglomerate product. Obviously a balance must be accomplished between the temperature at which the materials are plastic and suitable for agglomeration but such that the particles do harden upon further exposure to such temperature. The problem is further aggravated by the fact that as the particles pass downwardly through the kiln, any heat losses incurred serve to reduce the temperature in the hardening portion of the kiln where it is desired that the temperature be at a maximum. As a result, a continuing effort has been directed to the development of improved methods and apparatus for producing hardened carbonaceous agglomerates from such feedstocks.

It has now been found that such hardened carbonaceous agglomerates are readily produced by an improvement which comprises introducing a gas, which is optionally and preferably heated, into the discharge end of the rotary kiln, and thereby heating the agglomerate particles in the hardening section of the drum with the injected gas being withdrawn at the inlet end to the hardening zone. Thus the hardening zone of the drum is operated at elevated temperature without similarly elevating the temperature in the forming section.

Figure 2:
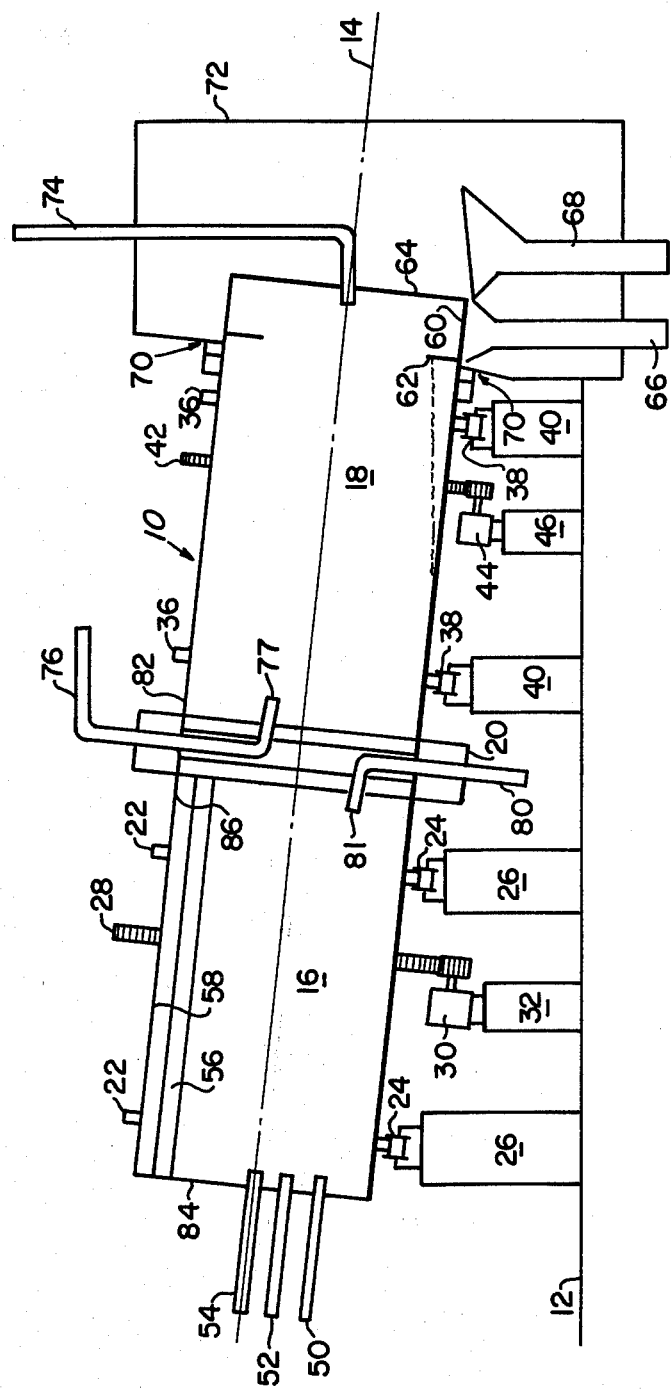

FIG. 1 is a schematic diagram of an embodiment of the apparatus of the present invention; and, FIG. 2 is a schematic diagram of a modification within the scope of the present invention of the apparatus shown in FIG. 1.

In FIG. 1 a rotary kiln 10 is shown positioned relative to the ground 12 for rotation about its horizontal axis 14, which is slightly inclined to facilitate the flow of materials through rotary kiln 10. Rotary kiln 10 includes a forming section 16 and a hardening section 18 rotatably joined by a collar 20. Forming section 16 is surrounded on its outer diameter by a pair of annular bearing rings 22 which mate with bearings 24 to support forming section 16 on supports 26. An annular gear 28 is positioned about the outer diameter of forming section 16 and operatively associated with a motor 30 which is supported on a mount 32 for rotating forming section 16. A pair of annular bearing rings 36 are positioned about the outer diameter of hardening section 18 and mate with bearings 38 which are supported on supports 40 to maintain hardening section 18 in position. An annular gear 42 is positioned about the outer diameter of hardening section 18 and is driven by a motor 44 which is supported on a support 46. Clearly, forming section 16 and hardening section 18 can be rotated at the same or different rotational speeds since they are rotatably joined by collar 20 and have independent drive systems. The feedstocks are charged to an inlet end 84 of forming section 16 through a coal inlet 50, a coal-derived solids inlet 52 and a binder inlet 54. It has been found in many instances that it is desirable to have a scrapper means 56 positioned in forming section 16 to remove adhesive material from the inner diameter 58 of forming section 16. As the feedstock materials pass along the length of rotary kiln 10, they are agglomerated in forming section 16 and hardened in hardening section 18. Optionally, a weir 62 or the like can be positioned at the discharge end 64 of rotary kiln 10 to control the residence time of solids in hardening section 18. A screen 60 is positioned downstream of wier 62 to recover finely divided solids via a recovery line 66 for recycle to the inlet to rotary kiln 10 or the like. The agglomerate particles pass from discharge end 64 of rotary kiln 10 into a product line 68 and are passed to storage, further sizing or the like. A jacket 72 is shown positioned about discharge end 64 and is sealingly joined to the outer diameter of rotary kiln 10 by a seal 70 to prevent the discharge of gases from discharge end 64 of rotary kiln 10. Desirably, rotary kiln 10 is completely sealed. A gas inlet 74 is positioned through jacket 72 for introducing a gaseous medium into hardening section 18. A recovery means, shown as a gas outlet 76 entering rotary kiln 10 through collar 20 is shown for withdrawing gases from rotary kiln 10. The positioning of gas outlet 76 permits the withdrawal of substantially all the gases charged through line 74 and, in addition, permits the withdrawal of additional gases if necessary to prevent the entry of the gases charged through line 74 into forming section 16. Such an arrangement permits the use of heated gas to raise the temperature in hardening section 18 without raising the temperature in forming section 16 substantially. Clearly, a plurality of gas inlets can be used on gas outlet 76 and the like as known to those skilled in the art. For simplicity, gas outlet 76 is shown having a single inlet 77, although it is contemplated that a variety of inlet configurations may be found desirable.

With reference to FIG. 2, a similar apparatus is shown, except that the gas recovery means is shown as a gas outlet 76, which is directed to recover gases from near the inlet end 82 of hardening section 18. Again, gas outlet 76 may have an inlet 77 comprising a plurality of inlets or the like as discussed above. A second gas withdrawal means shown as product gas recovery line 80 is provided. Product gas recovery line 80 is positioned to withdraw gases near the outlet end 86 of forming section 16. In such an embodiment, line 80 may have an inlet 81 inside rotary kiln 10 comprising a plurality of inlet openings and the like. In this embodiment, gases are withdrawn from forming section 16 via product gas recovery line 80 and can be passed to further processing and the like. Such is particularly desirable when the feedstocks charged to forming section 16 evolve substantial amounts of hydrocarbonaceous gases which are suitable for use as a fuel, further processing or the like. The contacting of such gases with heated gases or heated solids, for instance in hardening section 18, is in many instances undesirable since it may result in an undesirable cracking of the hydrocarbonaceous gases and the like. Clearly, when such an arrangement is used, it is necessary to control the rate of gas withdrawal so that line 76 withdraws primarily from hardening section 18 and so that line 80 withdraws primarily from forming section 16. Such a variation is particularly desirable in those instances where it may be desirable to inject limited amounts of oxygen into hardening zone 18 via line 74. Such a variation may be desirable when it is necessary to surface harden the agglomerates formed in forming section 16. The use of oxygen tends to accelerate the hardening process by reducing the fluidity of the components. Such is highly desirable in hardening zone 18 but obviously such an effect is highly undesirable in forming section 16; therefore, an embodiment such as shown in FIG. 2 is preferred when oxygen is used in hardening zone 18.

In the practice of the method of the present invention, a feedstock such as finely divided coal solids, finely divided coal-derived solids and hydrocarbonaceous binders is charged to the inlet end of rotary kiln 10. The feedstock may be any one or all of the materials listed in any combination. The primary criteria is that the mixture be an agglomeratable mixture, i.e. that it form agglomerates upon tumbling in forming zone 16. The determination of the criteria for the blend fed in forming zone 16 is well known to those skilled in the art, as set forth for instance, in the references listed above. In some instances, coal solids alone are suitable for thermoagglomeration; in other words, caking coals and the like can be agglomerated without the necessity for blending with coal-derived solids or hydrocarbonaceous binders. Finely divided coal-derived solids normally used are non-caking or semi-caking coals and may include other components such as char, petroleum derived solids, recycled fines recovered through line 66 and the like. The hydrocarbonaceous binders used can be selected from materials such as coal tars, asphaltic materials, coal extracts, heavy crude oils and heavy petroleum fractions, and in general any hydrocarbonaceous material which is fluid or plastic at the temperature at which forming zone 16 operates. As indicated above, such materials are well known to those skilled in the art as set forth in the references listed. As the feed materials are charged to forming zone 16, zone 16 is rotated at a speed selected to tumble the feedstock as it is rotated with its inner diameter 58 being scraped by scrapper 56 to prevent the buildup of feedstock materials on inner diameter 58. As the feedstocks pass through forming zone 16 they are agglomerated into discrete particles which pass outwardly into hardening zone 18 where, at an elevated temperature created by the injection of heated gas through line 74, the agglomerates are hardened with continued tumbling, although optionally at a different rate in hardening zone 18. As indicated, the residence time of the agglomerates in hardening zone 18 may be controlled by a weir 62 which controls the depth of the bed in hardening zone 18. The agglomerates, after passage through hardening zone 18, pass over a screen 60 where undersized particles are recovered through line 66. The fine particles recovered are of an arbitrarily fixed size determined by the end of the use of the agglomerate particles or the like. For instance, when the product is to be used as blast furnace coke, it may be desirable to recover through line 66 those particles smaller than $\frac{1}{2}''$ in diameter with the larger size agglomerates being recovered through line 68. In many instances the particles recovered through line 68 are further sized before passage to their end use. For instance, oversized particles may be recovered, crushed and added to the material in line 66 for recycle to the inlet to rotary kiln 10.

In a preferred embodiment of the method of the present invention, the heated gas is injected through line 74 to heat forming zone 18 to accelerate the hardening process by increasing the temperature. Such gases are recovered as shown in FIG. 1 near inlet end 82 of hardening section 18. Optionally, in such an embodiment, oxygen could also be injected in limited quantities to surface-oxidize the agglomerate particles. In such an instance, the oxygen-containing gas or more precisely, the products of the limited combustion resulting from the injection of the oxygen-containing gas can conveniently be recovered through line 76.

As is known to those skilled in the art, the agglomerate particles in zone 18 in many instances harden with no necessity for oxygen injection. Such hardening is a result of a number of complex factors, such as in some instances, further degassing of the agglomerate particles and the like. More commonly, the hardening is accomplished as a result of the carbonization of the agglomerate particles. Carbonization is a complex phenomenon which does not lend itself to ready definition, but in general, the term "carbonization" as used herein refers to a phenomenon whereby heavy hydrocarbonaceous materials under continued exposure to elevated temperatures change from thermoplastic in nature to thermosetting in nature. In other words, the agglomerate particles when heated initially become soft, plastic, flowable materials but after continued heating they resolidify and thereafter upon continued heating they vaporize or otherwise decompose without further softening. Such a change is called carbonization. Carbonization can be accomplished rapidly at high temperatures or more slowly at lower temperatures. The use of the rotary kiln utilizes the fact that a period of fluidity is accomplished prior to carbonization so that finely divided feedstocks can be and are, agglomerated while they are fluid or plastic in forming section 16 prior to hardening the same agglomerates with a very slight temperature increase in hardening section 18. Clearly, a temperature increase in hardening section 18 is desirable since it results in a more rapid carbonization rate and prevents the condensation of volatile tars and the like in hardening section 18. In some instances, carbonization may not be fully accomplished in hardening section 18, although even in such instances it is generally desirable to heat hardening section 18 to a temperature in excess of the temperature in forming section 16 since it is desirable that the agglomerates be hardened at least sufficiently to permit handling as solids in the recovery system.

Having thus described the present invention by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art upon a review of the foregoing description of preferred embodiments.

Having thus described the invention, I claim:

1. In a method for producing hardened carbonaceous agglomerates from a feedstock consisting of at least one material selected from the group consisting of finely divided coal solids, finely divided coal-derived solids and hydrocarbonaceous binders by charging said feedstock to rotary kiln at an elevated temperature, said rotary kiln being positioned to rotate about its horizontal axis, and tumbling said feedstock in said rotary kiln to produce said hardened carbonaceous agglomerates, said rotary kiln including a forming zone wherein said agglomerates are formed and a hardening zone wherein said agglomerates are hardened, the improvement comprising: passing a gas into said hardening zone to heat said agglomerates in said hardening zone, and recovering at least a portion of said gas from said hardening zone.

2. The improvement of claim 1 wherein said gas is a non-oxidizing gas.

3. The improvement of claim 1 wherein said gas is an oxidizing gas.

4. The improvement of claim 1 wherein said agglomerates are carbonized in said hardening zone.

5. In an apparatus for producing hardened carbonaceous agglomerates from a feedstock consisting of at least one material selected from the group consisting of finely divided coal solids, finely divided coal-derived solids and hydrocarbonaceous binders by charging said feedstock to a rotary kiln at an elevated temperature and tumbling said feedstock in said rotary kiln to produce said hardened carboanceous agglomerates, said apparatus comprising:
(a) a rotary kiln means, said rotary kiln being rotatably supported to rotate about its inclined horizontal axis and including a forming zone near its inlet end and a hardening zone near its outlet end;
(b) inlet means for introducing said feedstock into said inlet end of said rotary kiln means;
(c) product recovery means for recovering said hardened carbonaceous agglomerates from said outlet end of said rotary kiln;
(d) sealing means positioned to prevent the escape of gases from said rotary kiln; and
(e) means for controlling the residence time of said feedstock in said kiln; the improvement comprising in combination
(f) a gas inlet for introducing gas into said hardening zone near said outlet end of said rotary kiln; and
(g) a gas recovery means for withdrawing gas from said rotary kiln near the inlet end of said hardening zone.

6. The improvement of claim 5 wherein said forming zone and said hardening zone comprise rotary kiln sections rotatably joined at a collar means so that said forming zone and said hardening zone can be rotated at different speeds and wherein said gas recovery means comprises a gas withdrawal line positioned through said collar means for the withdrawal of gases from said rotary kiln near the inlet end of said hardening zone.

7. The improvement of claim 6 wherein said gas recovery means comprises in combination a first gas withdrawal means for selectively withdrawing gas from said hardening zone near its inlet end and a second gas withdrawal means for selectively withdrawing gas from said forming zone near its outlet end.

* * * * *

UNITED STATES PATENT AND TRADEMARK OFFICE
CERTIFICATE OF CORRECTION

PATENT NO. : 4,221,570
DATED : Sept. 9, 1980
INVENTOR(S) : George E. Wasson

It is certified that error appears in the above—identified patent and that said Letters Patent is hereby corrected as shown below:

Column 1, line 54, "outwardly" should read -- onwardly --.

Column 4, line 14, "outwardly" should read -- onwardly --.

Column 4, line 25, "end of the use" should read -- end use --.

Signed and Sealed this

Twenty-fifth Day of November 1980

[SEAL]

Attest:

SIDNEY A. DIAMOND

Attesting Officer

Commissioner of Patents and Trademarks